April 21, 1959 C. L. BRYAN ET AL 2,882,676
CABLE STRANDING APPARATUS
Filed Dec. 6, 1954

INVENTORS
C. L. BRYAN
R. GILLIS
By W.C. Parnell
ATTORNEY

April 21, 1959    C. L. BRYAN ET AL    2,882,676
CABLE STRANDING APPARATUS
Filed Dec. 6, 1954    3 Sheets-Sheet 3
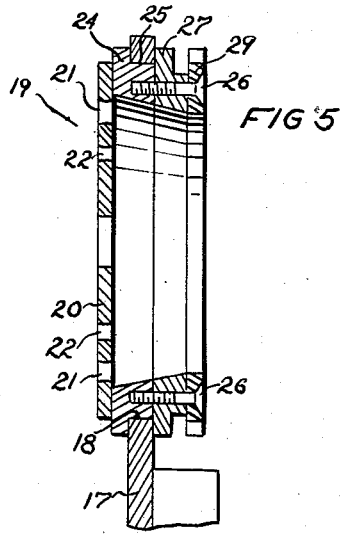
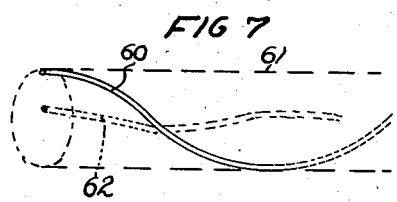
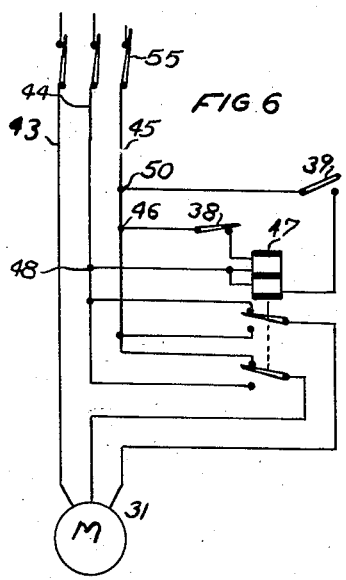
INVENTORS
C.L. BRYAN
R. GILLIS
By
W.C. Parnell
ATTORNEY

United States Patent Office 2,882,676
Patented Apr. 21, 1959

2,882,676

CABLE STRANDING APPARATUS

Chester L. Bryan, Buffalo, and Randall Gillis, Eggertsville, N.Y., assignors to Western Electric Company, Incorporated, New York, N.Y., a corporation of New York Application December 6, 1954, Serial No. 473,159

9 Claims. (Cl. 57—138)

This invention relates to cable stranding apparatus particularly apparatus for controlling the positions of the wires in the individual units of unit type cables.

In one well known stranding apparatus for making such cables the wires pass from stationary supply reels through stationary apertured guides or unit face plates, and through stationary unit forming dies to a common revolving takeup. In a cable formed in this manner, each unit follows a helical path but the wires in each unit remain in substantially the same relative positions with respect to the outside of the cable. As a result, the helical paths followed by the outer wires of the cable are longer than the paths of the wires nearer the center and when the first supply reel runs out, the others will still contain varying amounts of wire which must be scrapped. When stranding long lengths of cable, these wire remnants may range up to some hundreds of feet in length and this waste of wire becomes an appreciable factor in the cost of the cable.

The object of the invention is an apparatus for reducing this waste which is simple in structure yet highly efficient in substantially equalizing the lengths of the wires utilized in forming cables.

With this and other objects in view, the invention comprises a cable stranding apparatus including means for constantly shifting the relative positions of the individual wires so that over a long length of cable, each wire occupies many different relaive positions and the paths of the individual wires become of substantially the same total length.

In a multi-unit cable, a large part of the helix length variation is eliminated according to the invention by slow rotation of each unit about its own axis. For various reasons, this does not completely equalize the lengths of all the wires. One reason for this is that the individual units, which are circular at the forming dies, assume a non-circular cross-section in the finished cable and hence the rotation does not take place about the line of average helix variation. More nearly complete equalization, therefore, is obtained by performing a progressive transposition of the wires of each unit while the unit is being rotated.

One embodiment of stranding apparatus for performing these two operations includes a plurality of the apertured guides for groups of wires to form unit type cables, the guides being driven simultaneously by a reversible motor under the control of limit switches to rock the guides short of complete revolutions alternately in opposite directions. Interposed between the guides and the dies are transposing elements having apertures positioned and adapted to continuously interchange the outer and inner wires of each group or unit so that the helices of the wires will equalize to produce a longer cable from standard wire supplies and to minimize, if not eliminate, scrap wire.

Other objects and advantages will be apparent from the following detailed description when considered in conjunction with the accompanying drawings, wherein:

Fig. 5 is an enlarged vertical sectional view of one of the apertured guides;

Fig. 6 is a schematic wiring diagram of the control means for the apparatus, and Fig. 7 is a schematic illustration of the helices of an inner and outer wire of a cable.

Figure 1:
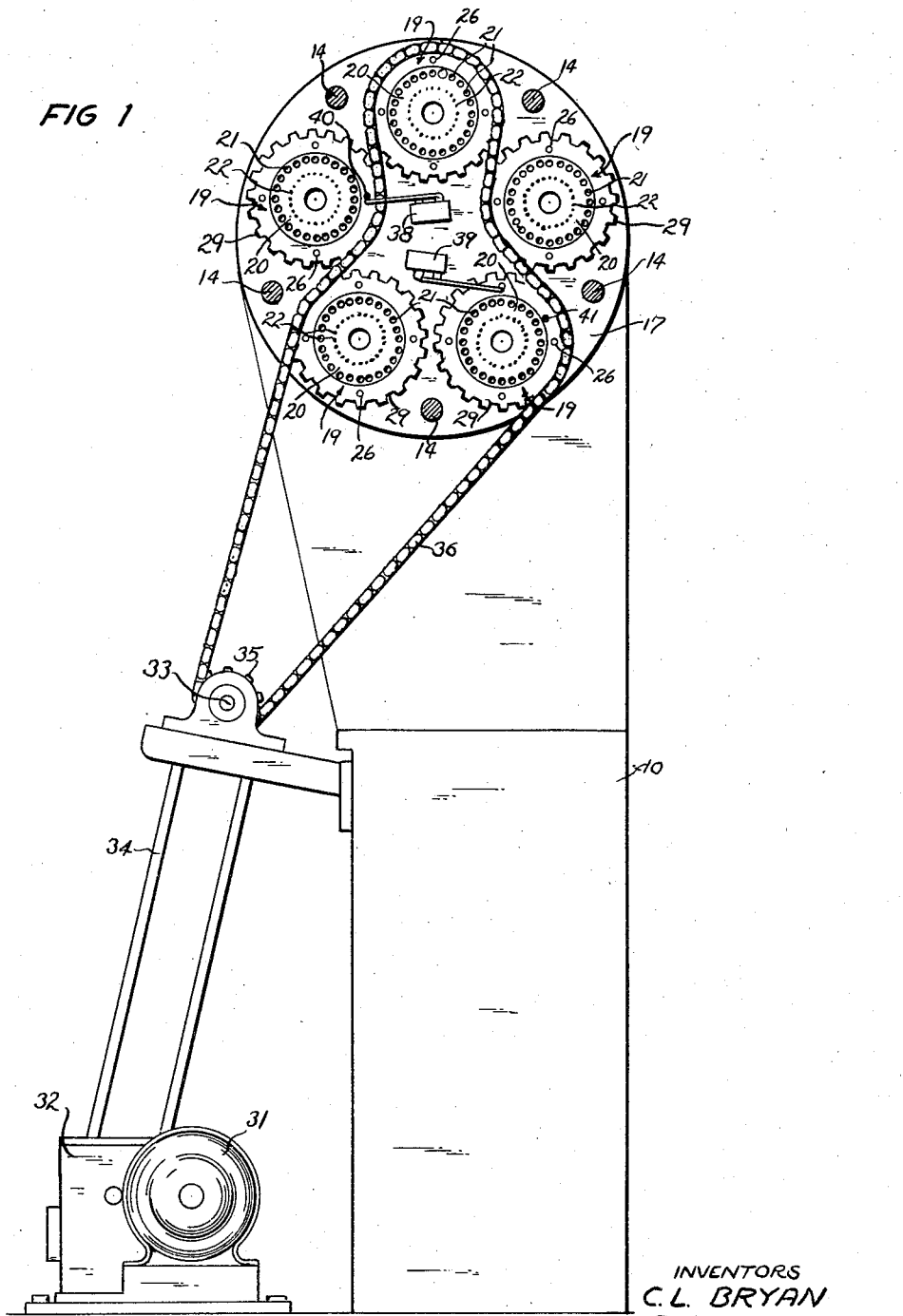
Fig. 1 is an end elevational view of the apparatus taken substantially along the line 1—1 of Fig. 2.
Figure 2:
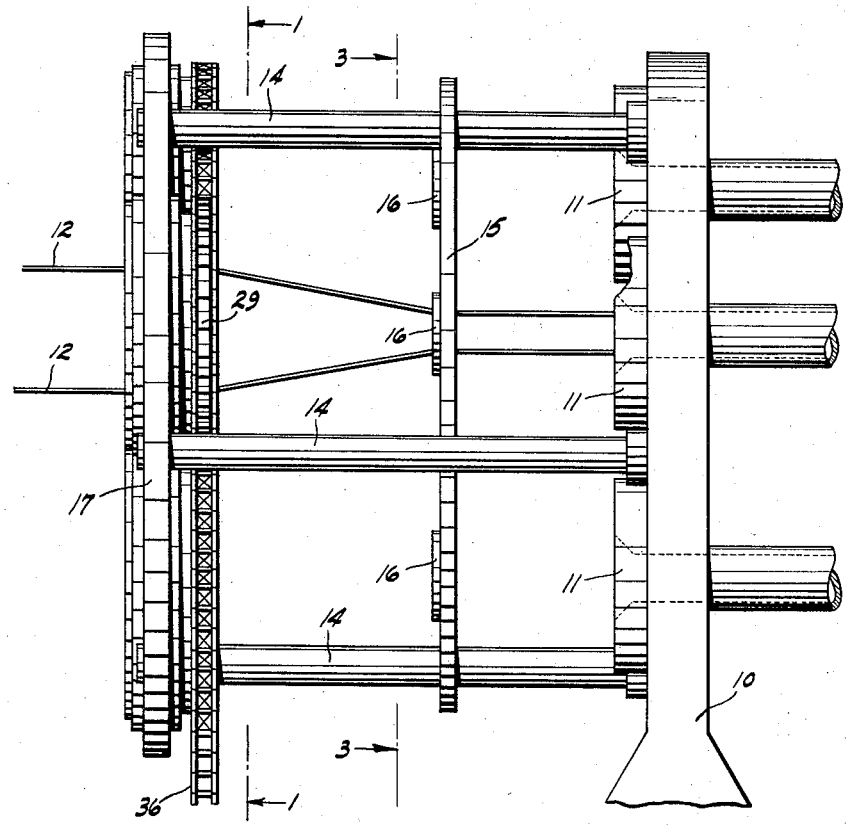
Fig. 2 is a fragmentary front elevational view of a portion of the apparatus.
Figure 3:
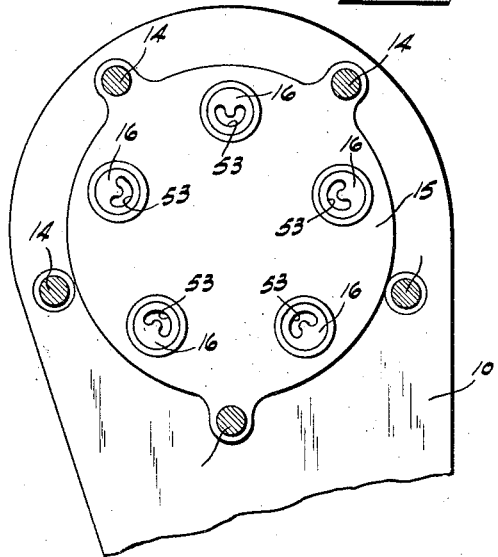
Fig. 3 is a fragmentary vertical sectional view taken substantially along the line 3—3 of Fig. 2.
Figure 4:
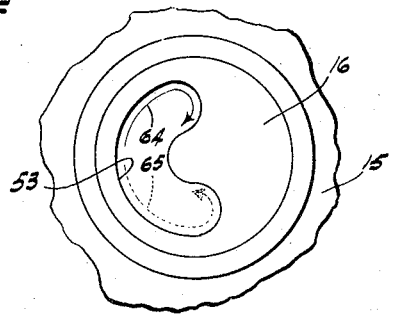
Fig. 4 is an enlarged front elevational view of one of the transposing units shown in Fig. 3.

Referring now to the drawings, attention is first directed to Figs. 1 and 2 which illustrates a frame 10 supporting a circular arrangement of forming dies 11 through which groups 12 of wires are advanced longitudinally and subsequently twisted helically after leaving the dies. The structure for twisting the wires is not shown as it is believed well known in the art. Five equally spaced parallel rods 14 fixedly supported at like ends to the frame 10 extend past a holder 15 for transposing elements 16 and have an apertured plate 17 mounted rigidly on the outer ends thereof. It will be noted in Fig. 3 that three of the rods 14 support the holder 15.

The plate 17 has apertures 18 at equally spaced positions therein for guides 19. The guides 19 are shown somewhat schematically in Fig. 1 but a detailed illustration of one of the guides is shown in Fig. 5 and it should be understood that the guides are of like structure. The guide 19 (shown in Fig. 5) includes a plate 20 having an outer group of apertures 21 and an inner group of apertures 22. In the present embodiment of the invention, the inner group of apertures are for single strands of wire while the larger outer group of apertures 21 are for double strands of wire. The plate 20 is mounted on a member 24 which has a reduced portion 25 extending through the aperture 18 where it is fixed by screws 26 to a member 27 to complete the mounting of the guide 19 in the aperture 18 of the plate 17. The members 24 and 27 have tapered inner apertures through which the strands of wire forming each group 12 may pass through their respective guide 19. An annular sprocket 29 is fixed to the members 24 and 27 by the screws 26, as illustrated in Fig. 5, and with the circular arrangement of guides 19, it is possible for a single driving means to cause rocking movement of the guides simultaneously alternately in reverse directions. The single driving means includes an electric motor 31 driving a speed reducing unit 32 which is operatively connected to a shaft 33 through a conventional belt and pulley connection 34. A sprocket 35 mounted on the shaft 33 is connected to the sprockets 29 of all of the guides 19 through a chain 36 as illustrated in Fig. 1.

Limit switches 38 and 39 are mounted at suitable positions whereby pins 40 and 41 of spaced guides 19 may operate the switches alternately to effect reversing of the motor 31 to reverse the direction of travel of the guides. Attention is directed to the schematic wiring diagram shown in Fig. 6 wherein the normally open switch 38 is shown closed to represent the position of the switch 38 in Fig. 1, completing a circuit from one of the main supply lines 43, 44 and 45, that is, from supply line 45 at connection 46 through the top winding of a double acting relay 47 to line 44 at connection 48. Energization of the top winding of the relay 47 has closed the top contacts to cause the motor 31 to drive in a given direction until the pin 41 closes switch 39 completing a circuit from line 45 at connection 50 through the lower winding of relay 47 to line 44 at connection 48. This will cause opening of the top contacts and closing of the bottom contacts to reverse the motor 31. Through this control means the guides 19 are rocked alternately approximately 320°. Furthermore, the chain connection with the sprockets of the various guides causes them to travel alternately in opposite directions and never simultaneously in the same directions.

The transposing elements 16 have kidney-shaped apertures 53 therein facing radially outwardly so as to produce like results for each group of wires.

Considering now the operation of the apparatus, let it be assumed that supplies of wires of like lengths are fed in groups through the apparatus and connected with the conventional means to advance the groups of wires longitudinally and to twist them helically after they leave the dies 11. After closing a main switch 55 in the main supply lines 43, 44 and 45, the motor 31 will rotate in a direction where the contacts for the relay 47 are at that time. The driving action of the motor 31 through the intermediate means for driving the guides 19 will continue until the alternate switch, for example, switch 39 is actuated into closed position to cause energization of the bottom winding of the relay 47 to operate its bottom contacts to reverse the direction of rotation of the motor. As a result of this driving means the guides 19 are rocked approximately .7 revolution per minute while the wires are advanced approximately 200 feet per minute. Through the rocking action of the guides 19, the outermost wires of the cable are periodically moved inwardly while the innermost wires are moved outwardly. This constant shifting of the wires tends to balance the helical paths of the wires. As an illustration, attention is directed to Fig. 7 illustrating at 60 the helix of an outer wire in a cable structure 61 as compared to the helix of an inner wire 62, making it apparent that if this condition continues to exist throughout the formation of the cable, the supply for the wire 60 would be spent far in advance of that of the wire 62. With this illustration in mind, it may be visualized how the differences in helices of the various wires in a unit type cable produced by the present apparatus would be multiplied when several groups of wires are brought into the formation of a single cable. Attention is now directed to each transposing element 16 (shown in Fig. 3) the function of which is to progressively force conductors into the inner part of a cable unit as the guide 19 is rocked, thereby allowing other conductors access to the outer row of the cable unit. This mixing action is possible because of the nature of the unit-forming die 11. This die 11 is of such a diameter that it allows the entire cable unit to be formed loosely yet placing a restriction on the number of conductors that can be accommodated in the outer row of the cable unit. Under the standard system of unit forming, certain conductors will set themselves into position in the outer row of a cable unit and maintain that same position throughout the stranding of the cable. The transposing element counteracts this arrangement by forcing conductors progressively inward leaving room in the outer row for conductors which were in the inner part of the cable unit. Since the conductors converge from the guides 19 to the relatively smaller die 11, the natural position of the conductor is at the outer surface of the die. Therefore, as some of the outer conductors are forced inwardly by the transposing element 16 they are replaced by other conductors from the inner layers of the cable unit. The solid line arrow 64 and the dotted line arrow 65 are only partially illustrative of the shifting of the wires during rocking movement of the guide 19. The inwardly central portion of each die 16 directs outer wires inwardly and pushes inner wires outwardly.

Therefore, there is a combination of the results of the guides 19 and the transposing elements 16 bringing about a constant shifting of the wires in each cable unit with respect to the wires in that particular cable unit and not only those of the adjacent cable units but the wires of the entire cable structure, constantly changing the helices of the wires to create a balance in the cable structures. It is apparent that as a result of these actions created by the guides 19, the transposing units 16 and the combination of their effects on the travel of the groups of wires, a substantial balance of the helices of the wires is established resulting in a production of longer cables and the minimizing of scrap wire. The invention may be exercised through the use of a single set of guide 19, transposing element 16 and die 11, or any desired number of sets grouped together, as shown in Fig. 1, to form non-unit or unit cables.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A cable stranding apparatus comprising a forming die for wires advanced longitudinally through the die and twisted helically after leaving the die to form a cable unit, a guide having circular arrangements of apertures for the wires mounted for rocking movement in advance of the die, means to rock the guide to vary the positions of the wires in the cable, and a stationary element interposed between the forming die and the guide and having an aperture therein with a surface of out-of-round contour to cause simultaneous movement of the outer wires inwardly in one direction and move the inner wires outwardly in another direction during rocking motion of the guide.

2. A cable stranding apparatus comprising a forming die for wires advanced longitudinally through the die and twisted helically after leaving the die to form a cable unit, a guide having circular arrangements of apertures for the wires mounted for rocking movement in advance of the die, means to rock the guide to vary the positions of the wires in the cable, and a stationary element interposed between the forming die and the guide and having an aperture therein with the surface curved to cause alternate transposing of inner and outer wires resulting from alternate rocking of the guide in reverse directions.

3. A cable stranding apparatus comprising an apertured forming die for a group of wires advanced longitudinally through the die and twisted helically after leaving the die to form a cable unit, the cross-sectional area of the aperture of the forming die being of a size to closely position the wires in the cable unit, a guide having circular arrangements of spaced apertures for the group of wires mounted for rocking movement in advance of the die, means to rock the guide to vary the positions of the wires in the cable unit, and a stationary element interposed between the forming die and the guide and having an aperture with a cross-sectional area larger than the cross-sectional area of the aperture of the forming die to maintain the wires moving therethrough in a group free to be moved laterally relative to each other while the rocking motion of the guide is imparted thereto, the aperture of the element having a stationary surface with reverse curves cooperating with the rocking motion given the group of wires by the guide to apply lateral motions to the group of wire to repeatedly move inwardly positioned wires of the group outwardly and outwardly positioned wires of the group inwardly.

4. A cable stranding apparatus comprising an apertured forming die for a group of wires advanced longitudinally through the die and twisted helically after leaving the die to form a cable unit, the cross-sectional area of the aperture of the forming die being of a size to closely position the wires in the cable unit, a guide having circular arrangements of spaced apertures for the group of wires mounted for rocking movement in advance of the die, means to rock the guide to vary the positions of the wires in the cable unit, and a stationary element interposed between the forming die and the guide and having an aperture of a size to closely position the group of wires while moving therethrough and allow lateral relative movement of the wires, the aperture of the element having a curved surface with portions thereof cooperating with the rocking motions imparted to the wires by the guide to cause simultaneous movement of outer wires of the group inwardly of the group and inner wires of the group outwardly of the group.

5. A cable stranding apparatus comprising a series of forming dies for groups of wires advanced longitudinally simultaneously through their respective dies to form individual cable units and twisted helically after leaving the dies to form a multiple unit cable, a guide for each group of wires having apertures to control the spaced positions of the wires in each group, means to support the guides in advance of the dies for rocking movements relative to each other, and means to repeatedly rock the guides to continuously vary the positions of the wires in each cable unit relative to each other and the adjacent wires of adjacent cable units with repeated reverse zig-zag lays of the wires.

6. A cable stranding apparatus comprising a series of forming dies for groups of wires advanced longitudinally simultaneously through their respective dies to form individual cable units and twisted helically after leaving the dies to form a multiple unit cable, a guide for each group of wires having apertures to control the spaced positions of the wires in each group, means to support the guides in advance of the dies for rocking movements relative to each other, means to repeatedly rock the guides to continuously vary the positions of the wires in each cable unit relative to each other and the adjacent wires of adjacent cable units with repeated reverse zigzag lays of the wires, and a stationary element for each group of wires interposed between the forming die and the guide therefor having an aperture of a size to closely position the wires of its respective group while moving therethrough and allow lateral relative movement of the wires, the aperture of each element having a curved surface with portions thereof cooperating with the rocking motions imparted to the wires by their respective guide to cause simultaneous movements of outer wires of the group inwardly of the group and inner wires of the group outwardly of the group.

7. A cable stranding apparatus comprising a series of forming dies for groups of wires advanced longitudinally simultaneously through the dies and twisted helically after leaving the dies to form a multiple unit cable, guides having circular arrangements of apertures for the groups of wires mounted at spaced positions for rocking movement in advance of their respective dies, and means to rock the guides alternately in opposite directions simultaneously to vary the positions of the wires in the cable.

8. A cable forming apparatus comprising a series of forming dies spaced from each other with their centerlines disposed out of alignment with each other to receive groups of wires and form cable units thereof while being advanced longitudinally through the dies and twisted helically after leaving the dies to form a multiple unit cable of the cable units, guides having circular arrangements of apertures therein for their respective groups of wires, means disposed in advance of the dies to support the guides for rocking movement about their axes in general alignment with their respective dies, and driving means operatively connected to the guides to rock the guides alternately in opposite directions to vary the directions of the lay of the wires in each cable unit and cause the directions of lay of the wires in the cable units to differ from the directions of lay of the cable units when twisted helically together to form the multiple unit cable.

9. A cable forming apparatus comprising a series of forming dies spaced from each other with their centerlines disposed out of alignment with each other to receive groups of wires and form cable units thereof while being advanced longitudinally through the dies and twisted helically after leaving the dies to form a multiple unit cable of the cable units, means to support the dies and position their entrance end in a common plane, guides having circular arrangements of apertures therein for their respective groups of wires, means disposed in advance of the dies to support the guides for rocking movement about their axes in general alignment with their respective dies, reversible power drive means, means operatively connecting the power drive means to the guides to rock the guides alternately in opposite directions to vary the directions of lay of the wires in each cable unit and cause the directions of lay of the wires in the cable units to differ from the directions of lay of the cable units when twisted helically together to form the multiple unit cable, and means responsive to the rocking movements of the guides to control reversing intervals of the power driving means.

References Cited in the file of this patent
UNITED STATES PATENTS

| | | |
|---|---|---|
| 630,334 | Dodd | Aug. 8, 1899 |
| 2,412,196 | Ashbaugh et al. | Dec. 10, 1946 |
| 2,530,726 | Rasmussen | Nov. 21, 1950 |
| 2,572,052 | Pheazey | Oct. 23, 1951 |